(12) United States Patent
Kim et al.

(10) Patent No.: US 9,692,311 B2
(45) Date of Patent: Jun. 27, 2017

(54) HIGH-VOLTAGE DIRECT CURRENT CONVERTER INCLUDING A 12-PULSE DIODE RECITIFIER CONNECTED IN SERIES WITH A VOLTAGE-SOURCE CONVERTER

(71) Applicant: KOREA ELECTRIC POWER CORPORATION, Seoul (KR)

(72) Inventors: Chan Ki Kim, Daejeon (KR); Jin Young Kim, Daejeon (KR); Dong Choon Lee, Daegu (KR); Thanh Hai Nguyen, Gyeongsan-si (KR)

(73) Assignee: KOREA ELECTRIC POWER CORPORATION, Seoul (KR)

( * ) Notice: Subject to any disclaimer, the term of this patent is extended or adjusted under 35 U.S.C. 154(b) by 0 days.

(21) Appl. No.: 14/781,582

(22) PCT Filed: Jun. 27, 2014

(86) PCT No.: PCT/KR2014/005726
§ 371 (c)(1),
(2) Date: Sep. 30, 2015

(87) PCT Pub. No.: WO2015/030359
PCT Pub. Date: Mar. 5, 2015

(65) Prior Publication Data
US 2016/0049880 A1   Feb. 18, 2016

(30) Foreign Application Priority Data
Aug. 29, 2013 (KR) .......................... 10-2013-0103492

(51) Int. Cl.
*H02M 1/12* (2006.01)
*H02M 5/458* (2006.01)
(Continued)

(52) U.S. Cl.
CPC .............. *H02M 5/458* (2013.01); *H02M 1/12* (2013.01); *H02M 7/10* (2013.01); *H02M 7/25* (2013.01); *H02J 3/36* (2013.01); *Y02E 60/60* (2013.01)

(58) Field of Classification Search
CPC .................................. H02M 5/458; H02M 1/12
See application file for complete search history.

(56) References Cited

U.S. PATENT DOCUMENTS 3,290,578 A * 12/1966 Ainsworth ............ H02M 1/146
333/176
4,308,575 A * 12/1981 Mase ........................ H02J 1/02
174/DIG. 17
(Continued)

FOREIGN PATENT DOCUMENTS

CN   201528281 U   7/2010
CN   103081335 A   5/2013
(Continued)

OTHER PUBLICATIONS

International Search Report dated Oct. 6, 2014, which issued in related International Application No. PCT/KR2014/005726.
(Continued)

*Primary Examiner* — Emily P Pham
(74) *Attorney, Agent, or Firm* — McDermott Will & Emery LLP

(57) ABSTRACT

The present invention relates to a high-voltage direct current (HVDC) converter comprising: a 12-pulse diode rectifier having two three-phase bridge diode rectifiers connected in series to rectify, to 12 pulses, alternating current (AC) power inputted from a point of connection on the sea; and a voltage-source converter connected in series to a lower end of the 12-pulse diode rectifier, wherein the voltage-source converter controls a voltage of the AC power inputted from
(Continued)

the point of connection on the sea and a DC link voltage of the voltage-source converter.

12 Claims, 8 Drawing Sheets

(51) Int. Cl.
*H02M 7/10* (2006.01)
*H02M 7/25* (2006.01)
*H02J 3/36* (2006.01)

(56) References Cited

U.S. PATENT DOCUMENTS

| | | | | |
|---|---|---|---|---|
| 4,445,166 | A | 4/1984 | Berglund et al. | |
| 4,837,671 | A * | 6/1989 | Wild | H02H 7/268 361/62 |
| 5,666,277 | A * | 9/1997 | Bjorklund | H02J 3/36 323/208 |
| 5,835,364 | A * | 11/1998 | DeWinter | H02M 7/19 363/44 |
| 6,728,120 | B1 * | 4/2004 | Greif | H02M 5/4585 363/40 |
| 9,502,991 | B2 * | 11/2016 | Lin | F03D 9/005 |
| 2005/0146226 | A1 * | 7/2005 | Trainer | H02M 1/12 307/73 |
| 2008/0205093 | A1 | 8/2008 | Davies et al. | |
| 2014/0146582 | A1 * | 5/2014 | Gupta | H02M 7/7575 363/35 |
| 2014/0268926 | A1 * | 9/2014 | Gupta | H02M 5/44 363/35 |

FOREIGN PATENT DOCUMENTS

| | | |
|---|---|---|
| EP | 1170851 A2 | 1/2002 |
| JP | 2001-238460 A | 8/2001 |
| KR | 10-1019683 B1 | 3/2011 |

OTHER PUBLICATIONS

Thanh Hai Nguyen et al., "A Series-Connected Topology of a Diode Rectifier and a Voltage-Source Converter for an HVDC Transmission System", IEEE Transactions on Power Electronics, vol. 29, No. 4, Apr. 2014, pp. 1579-1584.

Office Action Chinese Patent Application No. 201480024732.2 dated Mar. 9, 2017 w/English language translation.

Meng Wang et al., "A Power Resonance Compensation Control Strategy for PWM Rectifiers Under Unbalanced Grid Voltage Conditions", Proceedings of the CSEE, 2012 Chin. Soc. for Elect. Eng., Jul. 25, 2012, vol. 32, No. 21, pp. 46-53 w/English language Abstract.

Cheng Huang et al., "Proportional resonant control of VSC-HVDC system for offshore wind farms", Renewable Energy Resources, vol. 30, No. 5, May 2012, pp. 29-33, w/English language Abstract.

* cited by examiner

HIGH-VOLTAGE DIRECT CURRENT CONVERTER INCLUDING A 12-PULSE DIODE RECITIFIER CONNECTED IN SERIES WITH A VOLTAGE-SOURCE CONVERTER

CROSS-REFERENCE TO RELATED APPLICATIONS

This application is the U.S. National Phase of PCT/KR2014/005726 filed Jun. 27, 2014, which claims priority to Korean Patent Application No. 10-2013-0103492 filed Aug. 29, 2013. The subject matter of each is incorporated herein by reference in entirety.

BACKGROUND OF THE INVENTION

The present invention relates to a converter for high voltage direct current transmission, and more particularly, to a converter for high voltage direct current transmission which transmits electrical power generated by an offshore wind farm to an inland power grid using a converter topology in which a 12-pulse diode rectifier is connected in series to a voltage-source converter (VSC).

BACKGROUND ART

Recently, with an increasing need for power system protection and interest in environmental issues, high voltage direct current (HVDC) transmission techniques have attracted attention. HVDC transmission provides various advantages such as reduction in installation cost and space, easy connectivity with new renewable energy sources, high stability, and enhanced power quality.

An HVDC transmission system is divided into two topologies, i.e. line-commutated current-source converters (CSC-HVDC) using thyristors and self-commutated voltage-source converters (VSC-HVDC) using gate turn-off thyristors (GTOs) or insulated gate bipolar transistors (IGBTs).

FIG. 1 is a schematic diagram of one phase of a typical current-source HVDC system.

Referring to FIG. 1, a current-source converter 1 comprises two 3-phase 6-pulse bridge controlled rectifiers 2 connected in series.

The current-source converter 1 generates 12-pulse voltage on a DC-link and uses a Y/Y/Δ three-winding transformer 3 to remove $5^{th}$ and $7^{th}$ harmonics of grid current (i.e. a frequency (for example, 300 Hz) five times the fundamental frequency (for example, 60 Hz) and a frequency (for example, 420 Hz) seven times the fundamental frequency).

The Y/Y/Δ three-winding transformer 3 is connected to an AC bus 4 of an offshore wind power plant (not shown) or a grid. In addition, an AC filter 5 (or AC harmonic filter) connected to a front end of the Y/Y/Δ three-winding transformer 3 is connected to the AC bus 4 to remove harmonic current. The AC filter 5 serves to suppress and absorb emission of harmonics generated by the current-source converter and includes a resistor, a reactor, and a capacitor.

A smoothing reactor 6 disposed at an output end of the 3-phase 6-pulse bridge controlled rectifier 2 is used to protect the system from intermittent current, limit DC fault current, and smooth current on a DC power cable (not shown) (i.e. a cable for transmitting DC power to an inland power grid).

A DC filter 7 connected to a rear end of the smoothing reactor 6 includes a capacitor and is used to filter out harmonics from output voltage of the 3-phase 12-pulse bridge controlled rectifier 2.

Disadvantageously, in the current-source HVDC transmission system, an AC power supply requires reactive power for commutation of the thyristors, and information on voltage and frequency of the AC power supply is required. Such disadvantages of the current-source HVDC transmission system can be overcome by a self-commutated IGBT voltage-source converter, which can be controlled to generate or consume reactive power.

Advantageously, the voltage-source converter does not require an external voltage source to turn on an IGBT valve and can reduce the size of a filter.

FIG. 2 is a schematic diagram of an HVDC system using a typical voltage-source converter.

Referring to FIG. 2, a voltage-source converter 8 includes converter valves 9 connected in the form of a 2-level converter type bridge.

The voltage-source converter 8 may be replaced by a neutral-point clamped (NPC) multilevel converter or a modular multilevel converter (MMC). Each of the converter valves 9 includes several IGBT devices 10 connected in series, and the number of IGBT devices 10 depends upon rated voltage of the HVDC system.

The voltage-source converter 8 is connected to an AC side 11 through a boost inductor 12, shunt filters 13, and a transformer 14, and the boost inductor 12 serves to perform voltage boosting for controlling grid current and to suppress harmonic current which is generated due to switching of the voltage-source converter 8 and flows into a power grid. Two serial DC capacitors 15 connected to a rear end of the voltage-source converter 80 are connected between two poles 16, 17 of a DC power cable (not shown, a cable for transmitting DC power to an inland power grid).

The two DC capacitors 15 have the same capacitance.

The voltage-source HVDC system can provide excellent control performance and reduced installation space. However, the voltage-source HVDC system has a disadvantage of higher converter loss than a current-source HVDC system.

One example of the related art is disclosed in Korean Patent Registration No. 10-1019683 (issued on Feb. 25, 2011 and entitled "Voltage-sourced HVDC system with modulation function").

SUMMARY OF THE INVENTION

Technical Problem

The present invention has been conceived to solve the problems as described above and is aimed at providing a converter for high voltage direct current transmission, which uses a converter topology in which a 12-pulse diode rectifier is connected in series to a voltage source converter (VSC), thereby proving enhanced control performance and reduced installation space as compared with a typical current-source HVDC system.

In addition, the present invention is aimed at providing a converter for high voltage direct current transmission, which uses a converter topology in which a 12-pulse diode rectifier is connected in series to a voltage source converter (VSC), thereby providing reduced system costs and converter loss as compared with a typical voltage-source HVDC system.

Technical Solution

In accordance with one aspect of the present invention, a converter for high voltage direct current transmission includes: a 12-pulse diode rectifier including two three-phase full bridge diode rectifiers connected in series and rectifying AC power input from an offshore point of common coupling (PCC) into 12-pulse power; and a voltage-source converter connected in series to a lower end of the 12-pulse diode rectifier, wherein the voltage-source converter controls voltage of AC power input from the offshore PCC and DC link voltage of the voltage-source converter.

The converter for high voltage direct current transmission may further include a Y/Y/Δ 3-winding transformer connected to an input end of the 12-pulse diode rectifier and inputting AC power to each of the three-phase full bridge diode rectifiers of the 12-pulse diode rectifier.

The Y/Y/Δ 3-winding transformer may remove $5^{th}$ and $7^{th}$ harmonic current components generated by each of the three-phase full bridge diode rectifiers by virtue of 30° phase difference between two secondary side phase voltages of the Y/Y/Δ three-winding transformer.

The converter for high voltage direct current transmission may further include a filter inductor connected in series to an input side of each of the three-phase full bridge diode rectifiers, wherein each of two secondary sides of the Y/Y/Δ 3-winding transformer is connected in series to the filter inductor.

The converter for high voltage direct current transmission may further include an AC filter connected in parallel to a primary side of the Y/Y/Δ 3-winding transformer and removing higher order harmonics.

The AC filter may include a resistor, an inductor and a capacitor, and may remove higher order harmonic components of grid current, including at least $23^{rd}$ and $25^{th}$ harmonic components.

The converter for high voltage direct current transmission may further include a boost inductor connected in series to an input side of the voltage-source converter, wherein the boost inductor filters harmonic components generated in current due to switching of the voltage-source inverter, and a secondary side of a converter transformer is connected in series to the boost inductor.

The converter for high voltage direct current transmission may further include shunt AC filters disposed between the secondary side of the converter transformer and the boost inductor and removing higher order harmonics of grid current.

The voltage-source converter may include at least one of a 2-level voltage-source converter, a multilevel NPC converter, and a modular multilevel converter.

The converter for high voltage direct current transmission may have a rated voltage corresponding to ⅓ of rated voltage of an HVDC system.

The converter for high voltage direct current transmission may further include a control unit for controlling the voltage-source converter, wherein the control unit comprises: an offshore PCC voltage controller receiving an AC voltage command value and a measured value of AC voltage at the offshore PCC as a feedback signal and outputting a Q-axis command signal to control reactive power; a DC link voltage controller receiving a DC link voltage command value and a measured value of DC link voltage of the voltage-source converter as a feedback signal and outputting a D-axis command signal to control active power; a d-q converter converting a two-phase signal of the Q-axis command signal and the D-axis command signal output from the offshore PCC voltage controller and the DC link voltage controller, respectively, into a three-phase signal; a proportional-resonant controller removing $11^{th}$ and $13^{th}$ harmonic current components through band pass filtering, the harmonic current components being generated at the offshore PCC by the 12-pulse diode rectifier; and a space-vector PWM generator receiving a command value obtained by adding output of the proportional-resonant controller to output of the d-q converter and controlling each of IGBT devices constituting the voltage-source converter in a space-vector PWM manner.

Each of the offshore PCC voltage controller and the DC link voltage controller may be a proportional-integral (PI) controller.

Advantageous Effects

The present invention provides a converter for high voltage direct current transmission that uses a converter topology in which a 12-pulse diode rectifier is connected in series to a voltage source converter (VSC), thereby providing enhanced control performance and reduced installation space as compared with a typical current-source HVDC system while providing reduced system costs and converter loss and allowing easy maintenance as compared with a typical voltage-source HVDC system.

DETAILED DESCRIPTION OF THE PREFERRED EMBODIMENTS

Hereinafter, embodiments of the present invention will be described in detail with reference to the accompanying drawings.

It should be noted that the drawings are not to precise scale and may be exaggerated in thickness of lines or size of components for descriptive convenience and clarity. In addition, the terms used herein are defined by taking functions of the present invention into account and can be changed according to user or operator custom or intention. Therefore, definition of the terms should be made according to the overall disclosure set forth herein.

Figure 3:
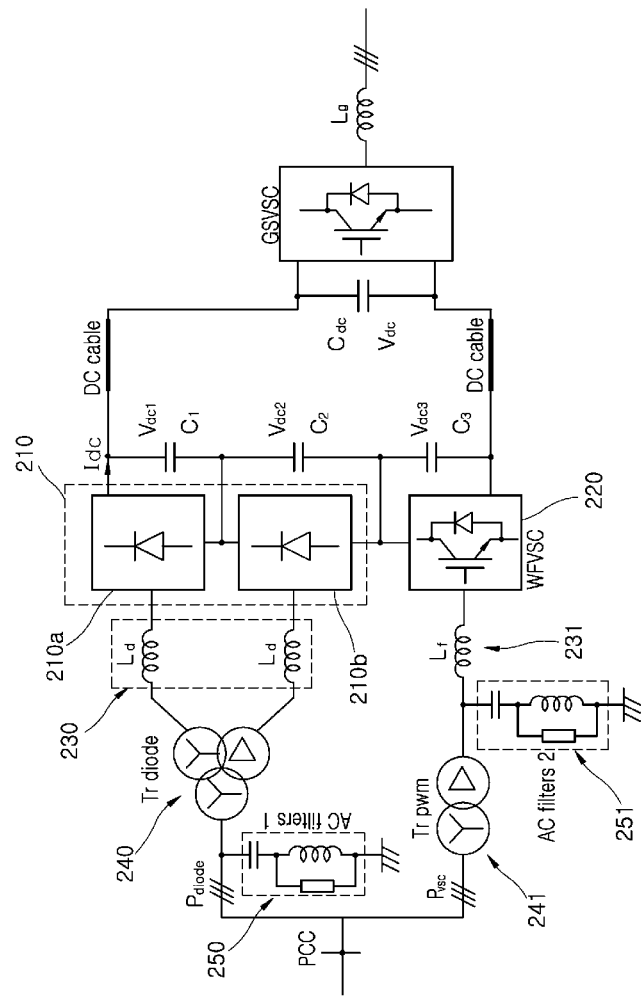
FIG. 3 is a schematic view of a converter topology of an HVDC transmission system according to one embodiment of the present invention.

FIG. 3 is a schematic view of a converter topology of an HVDC transmission system according to one embodiment of the present invention.

Referring to FIG. 3, a converter topology of an HVDC transmission system according to one embodiment of the present invention has a structure in which a 12-pulse diode rectifier 210 is connected in series to a voltage-source converter (VSC) 220. In this embodiment, the voltage-source converter 220, which is a wind farm-voltage-source converter (WFVSC), will be mainly described, and descriptions of a grid side-voltage-source converter (GSVSC) (or inverter), which is a power receiving point receiving DC-transmitted power, will be omitted.

The 12-pulse diode rectifier 210 has a structure in which two three-phase bridge diode rectifiers 210a, 210b are connected in series to each other via a Y/Y/Δ three-winding transformer, and rated power of the 12-pulse diode rectifier depends upon rated voltages of the 12-pulse diode rectifier 210 and the voltage-source converter 220 since current flowing through the voltage-source converter 220 is the same as that flowing through the 12-pulse diode rectifier 210.

In addition, rated voltage of the voltage-source converter 220 is selected to be as low as possible to reduce the number of IGBT devices used in the voltage-source converter 220. This is more effective in reducing the number of IGBT devices than reducing rated current. Among voltage-source converters 220, a 2-level voltage-source converter has the simplest structure.

In the converter topology in which the 12-pulse diode rectifier 210 is connected in series to the voltage-source converter 220, the 12-pulse diode rectifier 210 may receive some of AC power generated by an offshore wind farm (not shown), and the rest of AC power is naturally absorbed by the wind farm side voltage-source converter 220, since a wind farm side voltage-source converter 200 is controlled to operate as a voltage source at a fixed frequency.

Here, each of the 6-pulse diode rectifiers 210a, 210b of the converter topology is connected to a filter inductor 230 to reduce input harmonic current, and connected to an input three-phase AC power supply via a Y/Y/Δ three-winding transformer (Trdiode) 240. The three-winding transformer (Trdiode) 240 applies a proper voltage to the 12-pulse diode rectifier 210 to deliver some of AC power generated by the offshore wind farm to an output side.

$5^{th}$ and $7^{th}$ harmonic current components generated by each of the 6-pulse diode rectifiers 210a, 210b are canceled out at a primary side of the transformer due to 30° phase difference between two secondary side phase voltages of the Y/Y/Δ three-winding transformer (Tr diode) 240.

Here, AC filters 1 250 disposed at a front end of the Y/Y/Δ three-winding transformer (Tr diode) 240 filter out higher order frequency components of grid current, such as $23^{th}$ and $25^{th}$ harmonics and thus can further reduce amplitude of the grid current.

Advantageously, the 12-pulse diode rectifier 210 does not require reactive power to turn on diodes. In addition, since a DC link voltage is maintained at a constant level upon HVDC transmission, amperage of electric current flowing through the 12-pulse diode rectifier 210 depends on input side filter inductance ($L_d$).

In order to deliver electrical power through the 12-pulse diode rectifier 210, input voltage of the 12-pulse diode rectifier 210 must be higher than DC output voltage.

Inductance ($L_d$) of the filter inductor 230 is related to amount of active power flowing through the 12-pulse diode rectifier 210. Thus, since an average of DC link current ($I_{dc}$) depends on AC input voltage and inductance ($L_d$) of the filter inductor 230 when DC output voltages ($V_{dc1}$, $V_{dc2}$) of the 6-pulse diode rectifiers 210a, 210b are maintained at a constant level, the input side filter inductance ($L_d$) must be properly designed.

A boost inductor 231 is connected to a front input side of the voltage-source converter 220, and AC filters 2 251 for removing higher order harmonics of the grid current are connected between a converter transformer ($T_{rpwm}$) 241 and the boost inductor 231.

AC voltage input to the 12-pulse diode rectifier 210 from the offshore point of common coupling (PCC) is referred to as $P_{diode}$, and AC voltage input to the voltage-source converter 220 is referred to as $P_{vsc}$.

Figure 4:
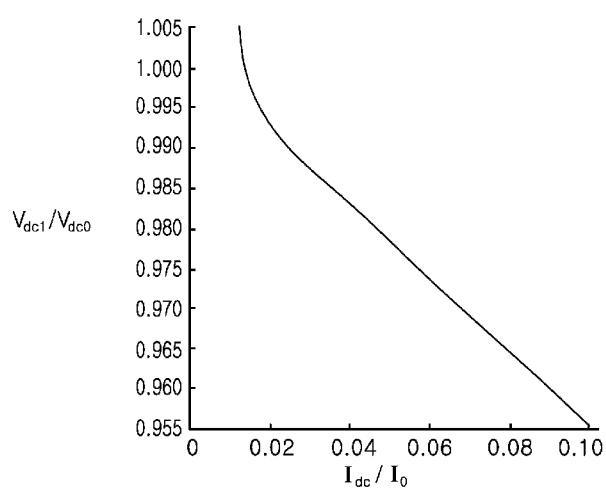
FIG. 4 is a view showing a relationship between DC side current of the three-phase bridge diode rectifier and DC link voltage with change of input side filter inductance according to one embodiment of the present invention.

FIG. 4 is a view showing a relationship between DC side current of the three-phase bridge diode rectifier and DC link voltage with change of input side filter inductance according to one embodiment of the present invention.

The graph showing the relationship between DC output voltage ($V_{dc1}$) and DC link current ($I_{dc}$) in FIG. 4 is used for design of input side filter inductance ($L_d$).

Here, $I_o$ is a value of short circuit current per phase of the 6-pulse diode rectifier 210a or 210b, and depends upon AC input voltage and input side filter inductance ($L_d$). $V_{dco}$ is an average of output voltage of the 6-pulse diode rectifier 210a or 210b under no-load conditions.

Since the 12-pulse diode rectifier 210 is uncontrollable, the voltage-source converter 220 is substantially used to operate the HVDC transmission system.

The voltage-source converter 220 is connected in series to the 12-pulse diode rectifier 210, and rated voltage of the voltage-source converter is set to ⅓ of HVDC rated voltage, equal to rated voltage of the 6-pulse diode rectifiers 210a, 210b. In other words, rated voltage of each of the two 6-pulse diode rectifiers 210a, 210b and the voltage-source converter 220 has a value obtained by trisecting the HVDC rated voltage. This means that rated power of the voltage-source converter 220 is ⅓ of rated power of the HVDC transmission system.

In the converter topology of the HVDC system according to the present invention, the voltage-source converter 220 operates as a voltage source at a fixed frequency.

Referring to FIG. 3, the boost inductor ($L_f$) 231 connected to the front end of the voltage-source converter 220 is needed to control grid current and voltage of the voltage-source converter 220, and may filter out high frequency current generated due to switching of the voltage-source converter.

In the converter topology of the HVDC system according to the present invention, the voltage-source converter 220 controls offshore AC voltage to have constant amplitude and frequency, such that power generated by the offshore wind farm is naturally absorbed by an HVDC link without any frequency/power control loop. Further, the voltage-source converter 220 is used to control DC link voltage ($V_{dc3}$).

Figure 5:
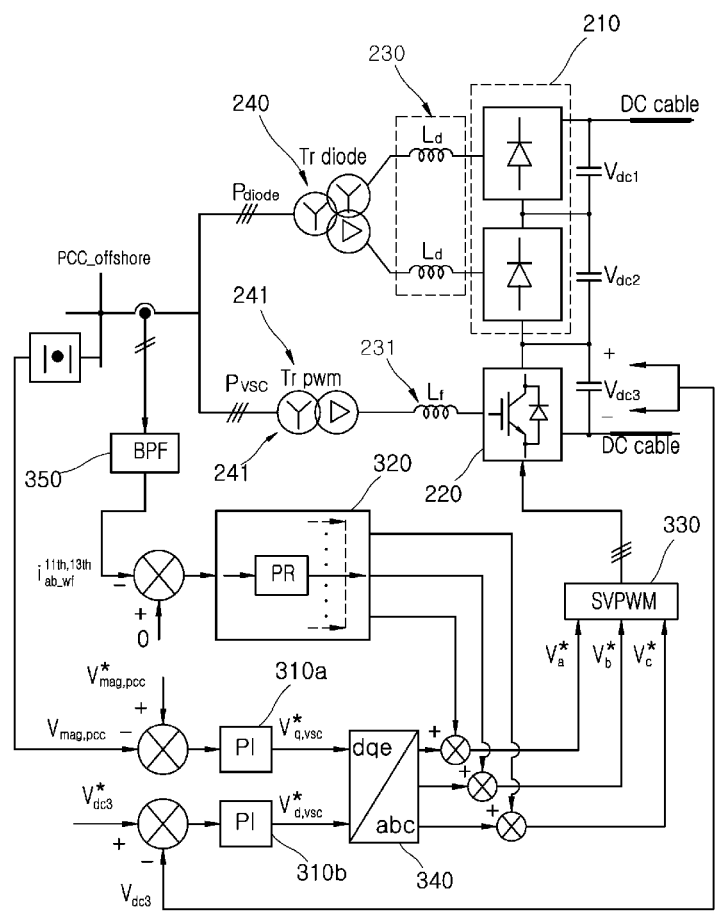
FIG. 5 is a schematic control block diagram of an HVDC system according to one embodiment of the present invention.

FIG. 5 is a schematic control block diagram of an HVDC system according to one embodiment of the present invention.

In other words, FIG. 5 is a schematic control block diagram of an HVDC system and a voltage-source converter according to the present invention. Offshore alternating current (AC) voltage and DC link voltage ($V_{dc3}$) of the voltage-source converter 220 are controlled according to the control block.

Here, a proportional-integral (PI) controller is used to control amplitude of AC voltage and DC link voltage of the voltage-source converter 220. In other words, AC voltage at an offshore point of common coupling (PCC) is measured and the measured value is used as a feedback signal for an offshore PCC voltage controller 310a. In addition, DC link voltage of the voltage-source converter 220 is measured and the measured value is used as a feedback signal for a DC link voltage controller 310b.

$V^*_{mag.pcc}$ and $V^*_{dc3}$, descriptions of which are omitted herein, are command values for controlling amplitude of AC voltage and DC link voltage of the voltage-source converter 220, respectively.

The offshore PCC voltage controller 310a and the DC link voltage controller 310b output a Q-axis command signal ($V^*_{q.vsc}$) to control reactive power and a D-axis command signal ($V^*_{d.vsc}$) to control active power, respectively, which are input to a d-q converter 340.

Output of each of the voltage controllers 310a, 310b, which is a voltage component in the d-q synchronous reference frame, is converted into a component in the three-phase reference frame. In other words, the d-q converter 340 converts a two-phase AC signal of the Q-axis command signal ($V^*_{q.vsc}$) and the D-axis command signal ($V^*_{d.vsc}$) into a three-phase signal.

In addition, $11^{th}$ and $13^{th}$ harmonic current components ($i_{ab-wf}^{11th,13th}$) generated at the offshore PCC by the 12-pulse diode rectifier 210 are extracted through a bandpass filter (BPF) 350 and removed using two proportional-resonant (PR) controllers 320.

Output of the proportional-resonant controller 320 is added to output converted into a value in the three-phase stationary reference frame through the d-q converter 340, and is used as command values ($V^*_a$, $V^*_b$, $V^*_c$) for space-vector pulse-width modulation (PWM). A space-vector pulse-width modulation (SVPWM) generator 330 generates a gating signal to turn on each of IGBT devices constituting the voltage-source converter 220.

Hereinafter, various configurations of the voltage-source converter 220 will be described.

Figure 6:
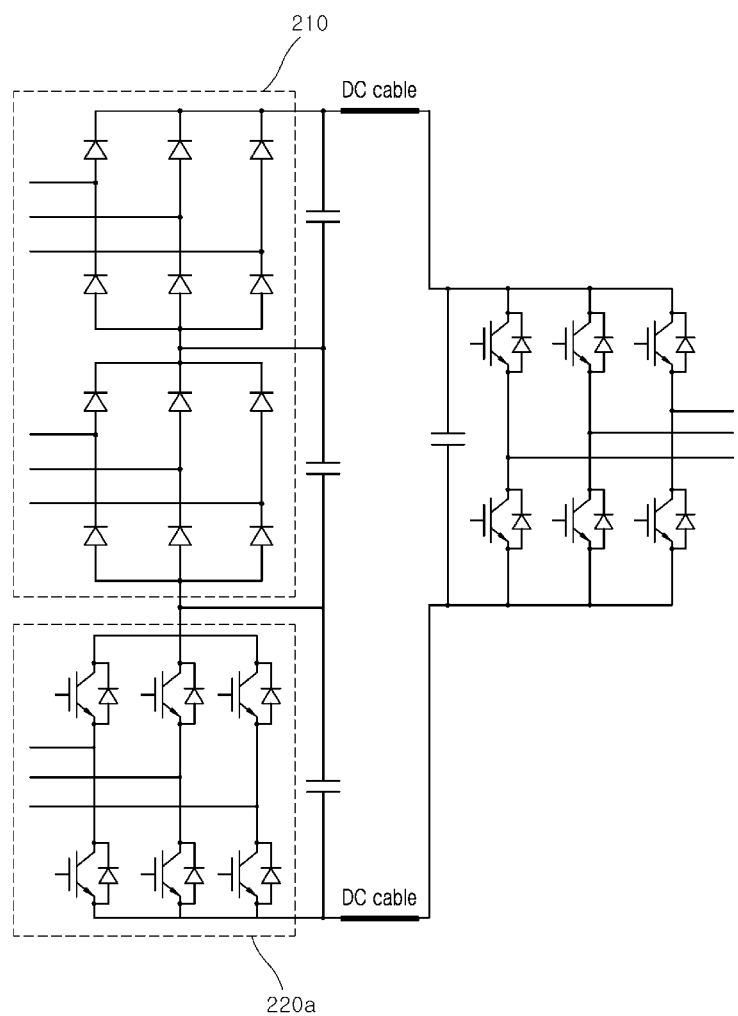
FIG. 6 is a schematic view of a converter topology of an HVDC system based on a 12-pulse diode rectifier and a 2-level voltage-source converter according to one embodiment of the present invention.

FIG. 6 is a schematic view of a converter topology of an HVDC system based on a 12-pulse diode rectifier and a 2-level voltage-source converter according to one embodiment of the present invention.

In the converter topology of the HVDC system according to the present invention, a voltage-source converter having the simplest structure is a 2-level voltage-source converter 220a as shown in FIG. 6, which is also referred to as a 2-level PWM converter.

Figure 1:
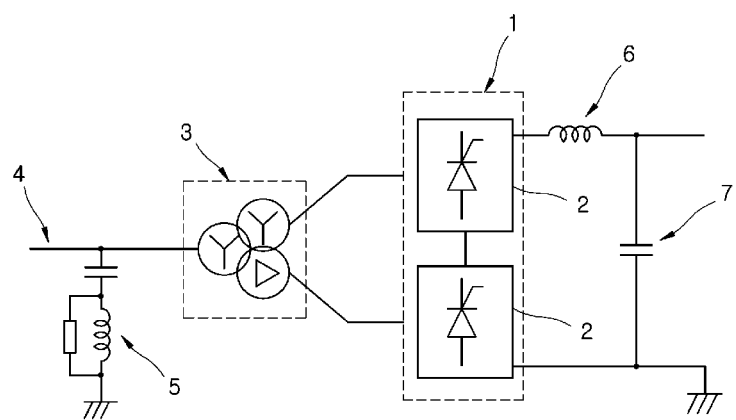
FIG. 1 is a schematic diagram of one phase of a typical current-source HVDC system.
Figure 2:
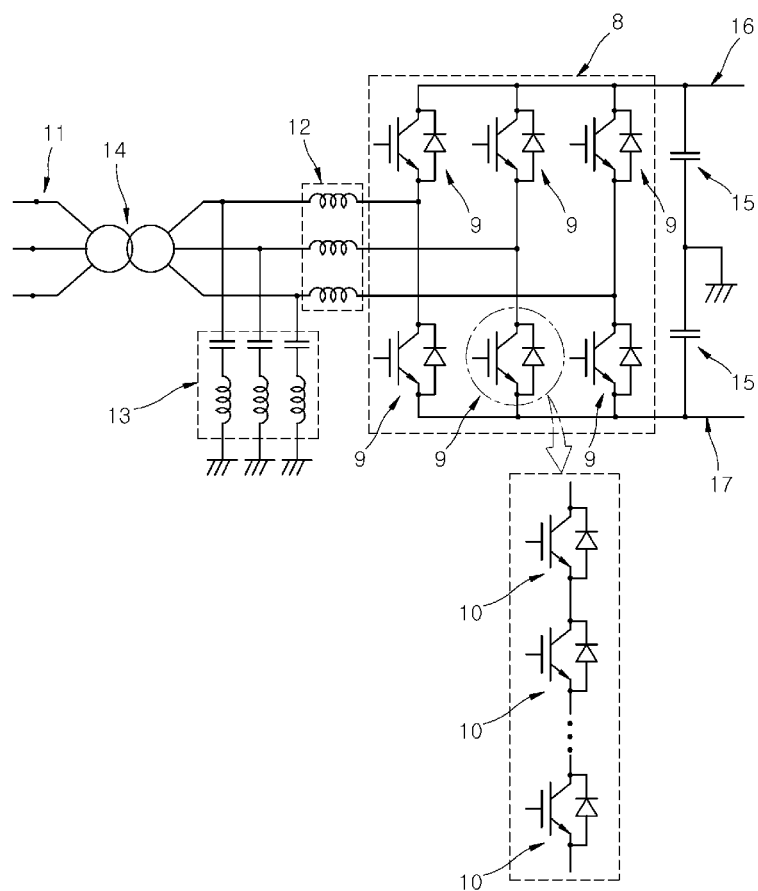
FIG. 2 is a schematic diagram of an HVDC system using a typical voltage-source converter.

The converter topology of the HVDC system according to the present invention is easy to operate and control, but requires a large number of IGBTs connected in series to a voltage-source converter valve to meet rated voltage of the HVDC system, as described with reference to FIG. 2. In addition, high switching frequency is required to reduce total harmonic distortion factor of the 2-level voltage-source converter 220a, which causes high switching loss of an HVDC converter and high voltage stress, particularly, in the case of the 2-level converter.

Voltage stress of the 2-level voltage-source converter of the HVDC system may be reduced by employing a multilevel voltage-source converter. In other words, in the converter topology of the HVDC system according to the present invention, as the voltage-source converter 220, a multilevel converter such as a 3-level NPC converter 220b may be used instead of the 2-level voltage-source converter 220a.

Figure 7:
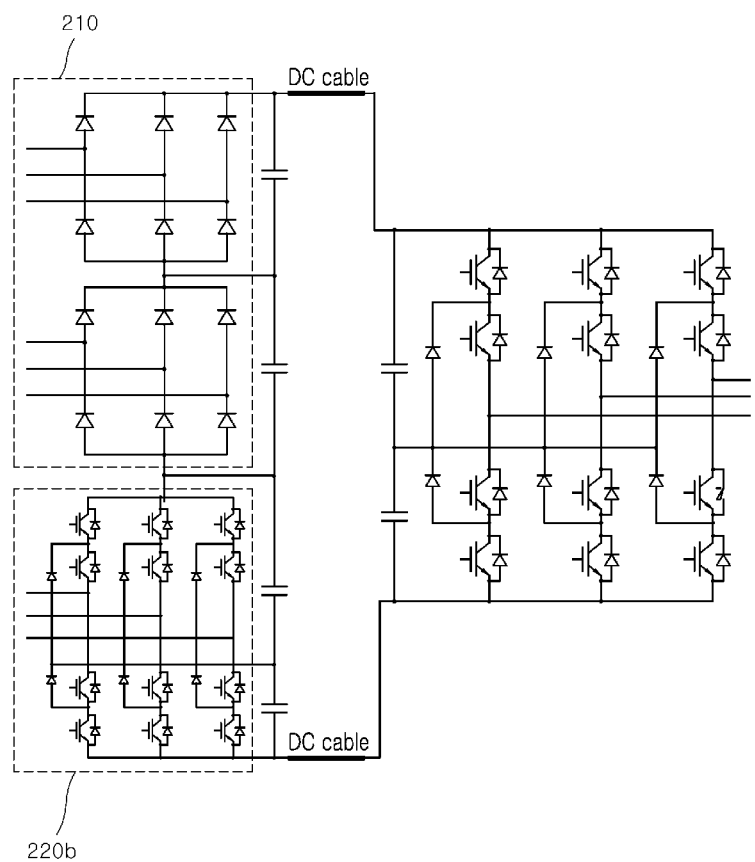
FIG. 7 is a schematic view of a converter topology of an HVDC system based on a 12-pulse diode rectifier and a 3-level NPC converter according to one embodiment of the present invention.

FIG. 7 is a schematic view of a converter topology of an HVDC system based on a 12-pulse diode rectifier and a 3-level NPC converter according to one embodiment of the present invention.

Here, like the 2-level PWM converter 220a, the 3-level neutral point clamped (NPC) converter 220b operates as a voltage-source converter and maintains amplitude and frequency of voltage at an offshore point of common coupling (PCC) at a constant level.

In addition, DC voltage of the 12-pulse diode rectifier 210 is indirectly controlled by controlling DC link voltage of the voltage-source converter 220. When the multilevel NPC converter 220b (or 3-level NPC converter) is used instead of the 2-level PWM converter 220a, it is possible to reduce switching frequency or to reduce the size of a filter inductor 230 (see FIG. 3) for a given total harmonic distortion factor. Voltage stress of a switching device (for example, IGBT) decreases with increasing level of the converter (dv/dt decreases).

Further, in the converter topology of the HVDC system according to the present invention, a modular multilevel converter (MMC) 220c may be used instead of the voltage-source converters 220a, 220b as set forth above.

Figure 8:
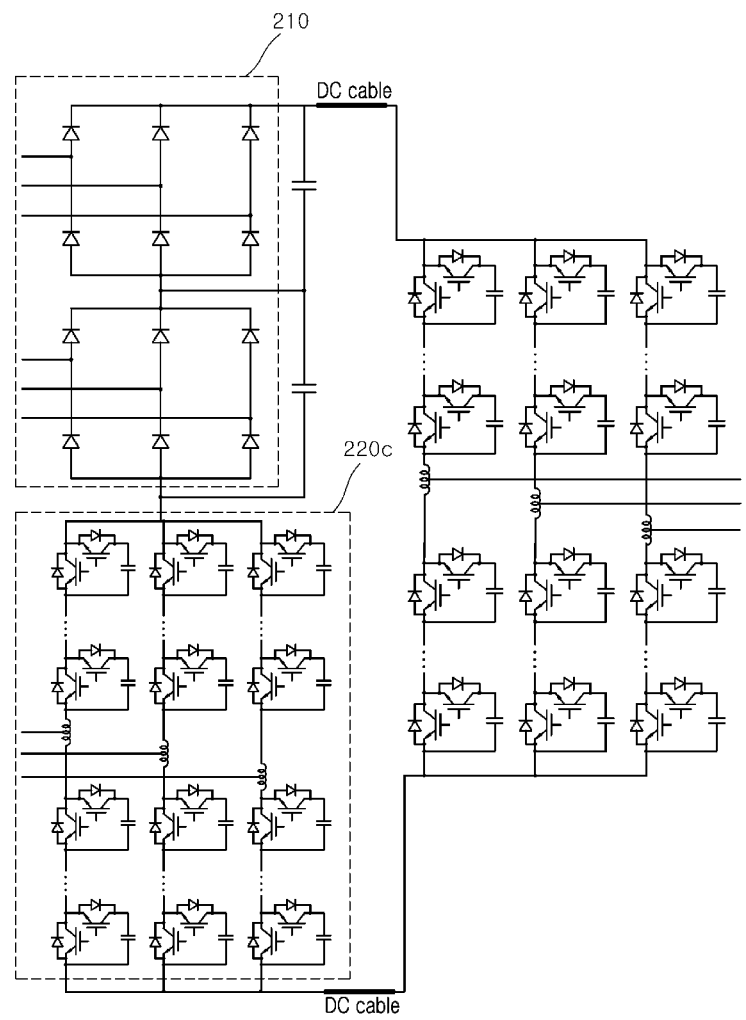
FIG. 8 is a schematic view of a converter topology of an HVDC system based on a 12-pulse diode rectifier and an MMC according to one embodiment of the present invention.

FIG. 8 is a schematic view of a converter topology of an HVDC system based on a 12-pulse diode rectifier and an MMC according to one embodiment of the present invention.

Here, the modular multilevel converter (MMC) 220c performs the same function as the 2-level PWM converter 220a as shown in FIG. 6 and the 3-level NPC converter 220b.

The modular multilevel converter (MMC) has the following advantages, as compared with the 3-level NPC converter 220b and the 2-level voltage-source converter 220a.

For example, 1) reduction in converter loss due to low switching frequency of semiconductor devices, 2) reduction in generation of harmonics→reduction in filter size, 3) high flexibility due to hardware and software modularization, 4) decrease in the number of main devices→high reliability, easy maintenance, 5) low voltage stress (dv/dt)→long lifespan of devices.

Advantageously, the converter topology including the modular multilevel converter (MMC) exhibits low converter loss and increased power capacity, thereby providing high flexibility.

As described above, in the converter topology of the HVDC transmission system, the 12-pulse diode rectifier 210 is connected in series to the voltage-source converter 220, and controllers 310a, 310b are provided to control amplitude of AC voltage and DC link voltage of the voltage-source converter 220, whereby an HVDC transmission system linked to an offshore wind farm can be simulated using PSCAD (i.e. simulation program for power system design). Here, as the voltage-source converter, a 2-level voltage-source converter (or 2-level PWM converter) 220a, a multilevel NPC converter 220b, or a modular multilevel converter (MMC) 220c may be used.

In addition, the converter topology of the HVDC transmission system obtained by connecting the 12-pulse diode rectifier 210 to voltage-source converter 220 in series, according to the present invention has a competitive advantage over topologies such as current-source HVDC and voltage-source HVDC transmission systems; and can be applied to AC grid connection of an offshore wind farm; used to delivery electrical power to distant areas; significantly reduce costs and system loss as compared with a typical voltage-source HVDC system; and provide enhanced system controllability as compared with a typical current-source HVDC system.

Although the present invention has been described with reference to some embodiments in conjunction with the drawings, it should be understood that these embodiments are provided for illustration only and that various modifications and other equivalent embodiments can be made without departing from the spirit and the scope of the present invention. Thus, the technical scope of the present invention should be determined by the attached claims.

What is claimed is:

1. A converter for high voltage direct current transmission, comprising:
    a 12-pulse diode rectifier including two three-phase full bridge diode rectifiers connected in series and rectifying AC power input from an offshore point of common coupling (PCC) into 12-pulse power; and
    a voltage-source converter connected in series to a lower end of the 12-pulse diode rectifier,
    wherein the voltage-source converter is a multi-phase converter in which multiple phases are coupled in parallel with each other at the lower end of the 12-pulse diode rectifier, and
    wherein the voltage-source converter controls voltage of AC power input from the offshore PCC and DC link voltage of the voltage-source converter.

2. The converter for high voltage direct current transmission according to claim 1, further comprising:
    a Y/Y/Δ 3-winding transformer connected to an input end of the 12-pulse diode rectifier and inputting AC power to each of the three-phase full bridge diode rectifiers of the 12-pulse diode rectifier.

3. The converter for high voltage direct current transmission according to claim 1, wherein the voltage-source converter has a rated voltage corresponding to ⅓ of rated voltage of an HVDC system.

4. The converter for high voltage direct current transmission according to claim 1, further comprising:
    a filter inductor connected in series to an input side of each of the three-phase full bridge diode rectifiers,
    wherein each of two secondary sides of the Y/Y/Δ 3-winding transformer is connected in series to the filter inductor.

5. The converter for high voltage direct current transmission according to claim 4, further comprising:
    an AC filter connected in parallel to a primary side of the Y/Y/Δ 3-winding transformer and removing higher order harmonics.

6. The converter for high voltage direct current transmission according to claim 5, wherein the AC filter comprises a resistor, an inductor and a capacitor, and removes higher order harmonic components of grid current, including at least 23rd and 25th harmonic components.

7. The converter for high voltage direct current transmission according to claim 1, further comprising:
    a control unit for controlling the voltage-source converter, wherein the control unit comprising:
    an offshore PCC voltage controller receiving an AC voltage command value and a measured value of AC voltage at the offshore PCC as a feedback signal and outputting a Q-axis command signal to control reactive power;
    a DC link voltage controller receiving a DC link voltage command value and a measured value of DC link voltage of the voltage-source converter as a feedback signal and outputting a D-axis command signal to control active power;
    a d-q converter converting a two-phase signal of the Q-axis command signal and the D-axis command signal output from the offshore PCC voltage controller and the DC link voltage controller, respectively, into a three-phase signal;
    a proportional-resonant controller removing 11th and 13th harmonic current components through band pass filtering, the harmonic current components being generated at the offshore PCC by the 12-pulse diode rectifier; and
    a space-vector PWM generator receiving a command value obtained by adding output of the proportional-resonant controller to output of the d-q converter and controlling each of IGBT devices constituting the voltage-source converter in a space-vector PWM manner.

8. The converter for high voltage direct current transmission according to claim 7, wherein each of the offshore PCC voltage controller and the DC link voltage controller is a proportional-integral (PI) controller.

9. The converter for high voltage direct current transmission according to claim 1, wherein the voltage-source converter comprises at least one of a 2-level voltage-source converter, a multilevel NPC converter, and a modular multilevel converter.

10. A converter for high voltage direct current transmission, comprising:
    a 12-pulse diode rectifier including two three-phase full bridge diode rectifiers connected in series and rectifying AC power input from an offshore point of common coupling (PCC) into 12-pulse power;
    a voltage-source converter connected in series to a lower end of the 12-pulse diode rectifier; and
    a Y/Y/Δ 3-winding transformer connected to an input end of the 12-pulse diode rectifier and inputting AC power to each of the three-phase full bridge diode rectifiers of the 12-pulse diode rectifier,
    wherein the voltage-source converter controls voltage of AC power input from the offshore PCC and DC link voltage of the voltage-source converter, and
    wherein the Y/Y/Δ 3-winding transformer removes 5th and 7th harmonic current components generated by each of the three-phase full bridge diode rectifiers by virtue of 30° phase difference between two secondary side phase voltages of the Y/Y/Δ three-winding transformer.

11. A converter for high voltage direct current transmission, comprising:
    a 12-pulse diode rectifier including two three-phase full bridge diode rectifiers connected in series and rectifying AC power input from an offshore point of common coupling (PCC) into 12-pulse power;
    a voltage-source converter connected in series to a lower end of the 12-pulse diode rectifier; and
    a boost inductor connected in series to an input side of the voltage-source converter,
    wherein the voltage-source converter controls voltage of AC power input from the offshore PCC and DC link voltage of the voltage-source converter, and
    wherein the boost inductor filters out harmonic components generated in current due to switching of the voltage-source inverter, and a secondary side of a converter transformer is connected in series to the boost inductor.

12. The converter for high voltage direct current transmission according to claim 11, further comprising:

an AC filter connected in parallel between the secondary side of the converter transformer and the boost inductor and removing higher order harmonics of grid current.

\* \* \* \* \*